(12) United States Patent
McLaughlin et al.

(10) Patent No.: US 8,790,810 B2
(45) Date of Patent: Jul. 29, 2014

(54) BATTERY CELL MODULE WITH SLIDING REPEATING ELEMENTS

(75) Inventors: Barton W. McLaughlin, Troy, MI (US); Michael A. Celotto, Fenton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 97 days.

(21) Appl. No.: 13/325,682

(22) Filed: Dec. 14, 2011

(65) Prior Publication Data

US 2013/0157098 A1 Jun. 20, 2013

(51) Int. Cl.
*H01M 10/50* (2006.01)
*H01M 6/46* (2006.01)
*H01M 2/16* (2006.01)

(52) U.S. Cl.
USPC ........... 429/120; 429/142; 429/143; 429/148; 429/162

(58) Field of Classification Search
USPC ......... 429/120, 159, 142, 143, 146, 148, 162, 429/163
See application file for complete search history.

(56) References Cited

U.S. PATENT DOCUMENTS

| | | | |
|---|---|---|---|
| 2010/0270127 A1* | 10/2010 | Zehnder et al. | 198/499 |
| 2011/0293983 A1* | 12/2011 | Oury et al. | 429/120 |
| 2012/0308868 A1* | 12/2012 | Kruger et al. | 429/120 |

* cited by examiner

*Primary Examiner* — Muhammad Siddiquee
(74) *Attorney, Agent, or Firm* — Fraser Clemens Martin & Miller LLC; J. Douglas Miller

(57) ABSTRACT

A battery cell module includes a battery cell, a sliding repeating element, and a guide rail. The repeating element is disposed adjacent the battery cell. A gap is defined between the battery cell and the repeating element. The repeating element has a main body with at least one spacer coupled thereto. The guide rail cooperates with the at least one spacer and permits the repeating element to move with an expansion of the battery cell. The cooperation of the guide rail with the at least one spacer thereby militates against an overcompression of the battery cell.

18 Claims, 4 Drawing Sheets

BATTERY CELL MODULE WITH SLIDING REPEATING ELEMENTS

FIELD OF THE INVENTION

The present disclosure relates to a battery cell module and more particularly to a cooling system for the battery cell module.

BACKGROUND OF THE INVENTION

A battery cell has been proposed as a clean, efficient and environmentally responsible power source for electric vehicles and various other applications. One type of battery cell is known as the lithium-ion battery. The lithium-ion battery is rechargeable and can be formed into a wide variety of shapes and sizes so as to efficiently fill available space in electric vehicles. For example, the battery cell may be in the form of a prismatic can.

A plurality of the battery cells can be provided in a battery cell pack or module to provide an amount of power sufficient to operate electric vehicles. Battery cells such as lithium-ion battery cells are known to generate heat during operation and as a result of a charge cycle when recharging. When overheated or otherwise exposed to high-temperature environments, undesirable effects can impact the operation of lithium-ion batteries. In typical battery cell modules, the battery cells expand and contract with change in temperature.

Cooling systems are typically employed with battery cell modules to militate against the undesirable overheating conditions. Conventional cooling systems have included repeating elements such as cooling plates disposed between individual battery cells within the battery cell module. The repeating elements define air cooling gaps or channels in between the battery cells for cooling the battery cell module in operation by circulation of air through the battery cell module. However, in known battery cell modules where alternating battery cells and repeating elements are rigidly fixed under compression, the expansion of the battery cells with the change in temperature can undesirably result in an overcompression of the battery cells, as well as a reduction in width of the cooling gaps, that negatively impacts a useable life of the battery cell module.

There is a continuing need for a battery cell module that allows for the repeating elements to move and accommodate an entire range of thicknesses of the battery cells during expansion of the battery cells in operation, while also retaining the repeating elements in other directions and militating against overcompression of the battery cells. Desirably, the battery cell module decouples the expansion of the battery cells from widths of the cooling gaps defined by the repeating elements and the battery cells, maintains a substantially constant width for each of the cooling gaps between the repeating elements and the battery cells, and allows both thicknesses of the battery cells and the widths of the cooling gaps to be optimized.

SUMMARY OF THE INVENTION

In concordance with the instant disclosure, a battery cell module that allows for the repeating elements to move and accommodate an entire range of thicknesses of the battery cells during expansion of the battery cells in operation, while also retaining the repeating elements in other directions and militating against overcompression of the battery cells, and which decouples the expansion of the battery cells from widths of the cooling gaps defined by the repeating elements and the battery cells, maintains a substantially constant width for each of the cooling gaps between the repeating elements and the battery cells, and allows both thicknesses of the battery cells and the widths of the cooling gaps to be optimized, is surprisingly discovered.

In an exemplary embodiment, a battery cooling system includes a battery cell module with battery cells, side rails and repeating elements. The repeating elements have integral spacers. These spacers are sized to prevent the battery cells from being compressed more than a predetermined amount, militating against an overcompression of the battery cells. The battery cooling system can be employed independent of the other elements of the repeating units. The side rails constrain the repeating elements in two axes but allow for the repeating elements to move in a third axis. As the battery cell module is stacked by alternating the battery cells and the repeating units, the spacers of the repeating units fit inside the side rails. The side rails are capped by a module end plate installed after battery cell module stacking and compression have been completed. The battery cell module has one or several spring elements (such as a metallic spring or foam) which provide a desired force/deflection curve to the battery cells. As the battery cells expand in thickness due to a variety of factors, such as changes in a state of charge or cell expansion due to cell aging, the repeating elements are free to slide in the direction of the thickness changes. Additionally, the cooling system comprehends changes in initial thickness due to variation from the battery cell manufacturing process.

In a first embodiment, a battery cell module includes a battery cell, a sliding repeating element, and a guide rail. The repeating element is disposed adjacent the battery cell. A gap is defined between the battery cell and the repeating element. The repeating element has a main body with at least one spacer coupled thereto. The guide rail cooperates with the at least one spacer and permits the repeating element to move with an expansion of the battery cell, thereby militating against an overcompression of the battery cell.

In another embodiment, a battery cell module includes a plurality of battery cells, a plurality of sliding repeating elements, and at least one guide rail. The repeating elements alternate with the battery cells in a stack. A plurality of gaps are defined between the battery cells and the repeating elements. Each of the repeating elements has a main body with at least one spacer coupled thereto. The at least one guide rail cooperates with the spacers and permitting the repeating elements to move with an expansion of the battery cells. The cooperation of the at least one guide rail with the spacers militates against an overcompression of the battery cells.

In a further embodiment, a battery cell module includes a plurality of battery cells, a plurality of repeating elements, and at least one guide rail. The repeating elements alternate with the battery cells in a stack and define a plurality of gaps therebetween. Each of the repeating elements has a main body with at least one spacer coupled thereto. Each of the repeating elements also includes at least one gap setting portion having a thickness greater than a thickness of a major or remaining portion of the main body. Each of the gap setting portions abuts one of the battery cells. The at least one guide rail cooperates with the spacers and permits the repeating elements to move with an expansion of the battery cells and militate against an overcompression of the battery cells. The at least one guide rail constrains the at least one spacer on a Y-axis along a height of the battery cell module, an X-axis along a width of the battery cell module, and a Z-axis along a length of the battery cell module.

DRAWINGS

The above, as well as other advantages of the present disclosure, will become readily apparent to those skilled in the art from the following detailed description, particularly when considered in the light of the drawings described herein.

DETAILED DESCRIPTION OF THE INVENTION

Figure 1:
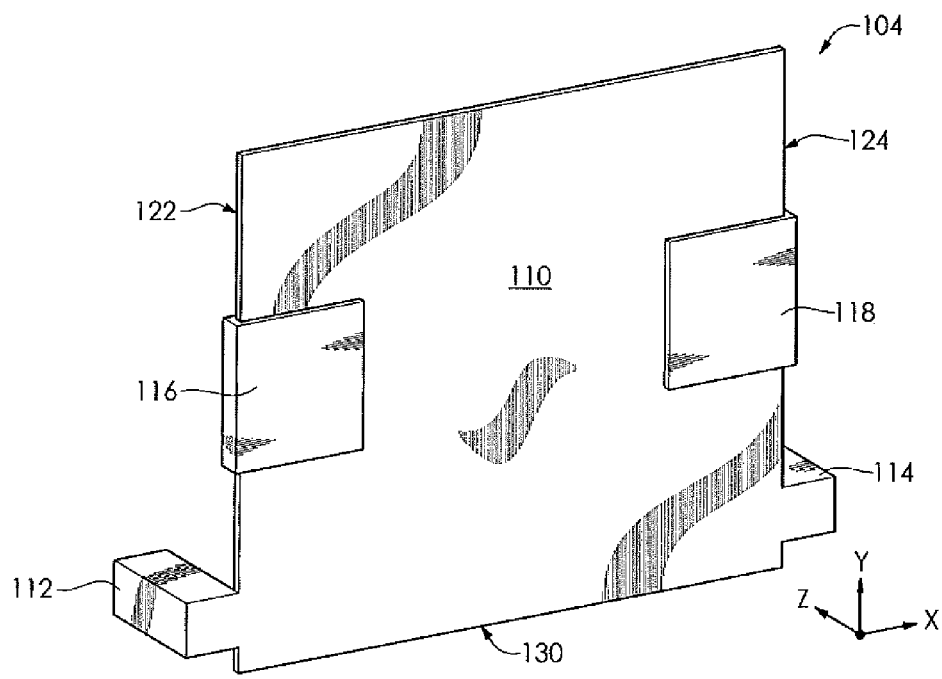
FIG. 1 is a front perspective view of a repeating element for a battery cell module according to one embodiment of the present disclosure.

The following detailed description and appended drawings describe and illustrate various embodiments of the invention. The description and drawings serve to enable one skilled in the art to make and use the invention, and are not intended to limit the scope of the invention in any manner.

With reference to FIGS. 1-8, a battery cell module 100 according to the present disclosure includes at least one battery cell 102, at least one repeating element 104, and at least one guide rail 106. The repeating element 104 is disposed adjacent the battery cell 102. A gap 108 is defined between the battery cell 102 and the repeating element 104, and provides a path for a cooling air flow through the battery cell module 100. The guide rail 106 permits the repeating element 104 to move slidably with an expansion of the battery cell 102, and thereby militate against an overcompression of the battery cell 102 in operation.

As shown in FIGS. 5-8, a plurality of the battery cells 102 is arranged in a stack, alternating with a plurality of the repeating elements 104, to form the battery cell module 100. The battery cell module 100 may include a compression system (not shown) that provides a desired compressive force to the plurality of battery cells 102 and the plurality of repeating elements 104. The battery cell module 100 may also include a pair of the guide rails 106 with the battery cells 102 and the repeating element 104 disposed therebetween. As a nonlimiting example, the compression system may include at least one spring element (not shown), such as a metallic spring or a foam spring. Threaded compression rods (not shown) may also be employed, in certain embodiments. The guide rails 106 are also rigidly retained within the battery cell module 100 through retaining means (not shown) such as cooperating plates disposed at ends of the battery cell module 100. Other means for securing the battery cells 102, the repeating elements 104, the guide rails 106, and other elements or sub-modules in the battery cell module 100 may be employed, as desired.

The battery cells 102 shown in FIGS. 5-8 are prismatic can-type battery cells. As a nonlimiting example, each of the battery cells 102 may be a prismatic can-type lithium ion (Li-ion) battery cell. The battery cells 102 may also be in electrical communication, for example, via a series of wire harnesses, busbars, or the like, which are capable of delivering power from the battery cells 102 to a load such as an electric vehicle. It should be appreciated that other can-type battery cells 102, employing a different structure such as a pouch cell and a different electrochemistry, may also be used within the scope of the present invention.

Figure 2:
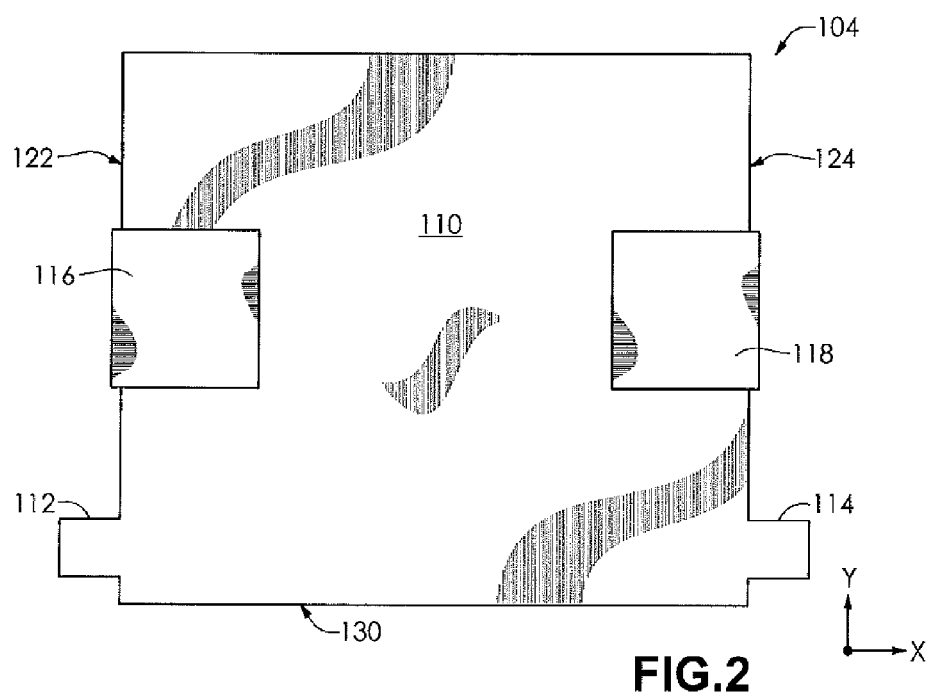
FIG. 2 is a front elevational view of the repeating element depicted in FIG. 1.

With renewed reference to FIGS. 1-2, the repeating element 104 of the present disclosure has a main body 110 with at least one spacer 112, 114 coupled thereto. The repeating element 104 further includes at least one gap setting portion 116, 118. The at least one gap setting portion 116, 118 has a thickness that is greater than a thickness of a remaining major or remaining portion 120 of the main body 110. The at least one gap setting portion 116, 118 abuts the battery cell 102, and thereby forms a space of a predetermined width that defines the gap 108 between the battery cell 102 and the repeating element 104. As a nonlimiting example, the repeating element 104 may be a cooling plate. One of ordinary skill in the art should appreciate that the repeating element 104 may be formed separately or integrally with other components of the battery cell module 100, as desired.

In the embodiment depicted in FIGS. 1-2, the at least one gap setting portion 116, 118 includes a first gap setting portion 116 adjacent a first side 122 of the main body 110, and a second gap setting portion 118 adjacent a second side 124 of the main body 110. The first and second gap setting portions 116, 118 may also be substantially vertically centered on the repeating element 104. Alternative locations, sizes, and shapes of the at least one gap setting portion 116, 118 may also be used within the scope of the disclosure.

With further reference to FIGS. 1-2, the repeating element 104 also includes the at least one spacer 112, 114. The at least one spacer 112, 114 is coupled to one of the first and second sides 122, 124 of the repeating module 104. The at least one spacer 112, 114 may be integrally formed with the main body 110, or may be separately formed and then attached to the main body 110, as nonlimiting examples. In an illustrative embodiment, the at least one spacer 112, 114 includes a first spacer 112 and a second spacer 114. The first spacer 112 is coupled to the first side 122 of the main body 110. The second spacer 114 is coupled to the second side 124 of the main body 110. In particular, each of the first spacer 112 and the second spacer 114 may be disposed adjacent a bottom side 130 of the main body 110. As shown, the at least one spacer 112, 114 may be substantially quadrilateral-shaped in cross-section. However, other locations, sizes, and shapes of the at least one spacer 112, 114 may also be employed, as desired.

Upon assembly of the battery cell module 100, the at least one spacer 112, 114 is slidably disposed in the guide rail 106. Advantageously, the guide rail 106 constrains the at least one spacer 112, 114 along a first axis and a second axis, and permits a movement of the at least one spacer 112, 114 along a third axis. In certain embodiments, the interface between at least one of the guide rail 106 and the at least once spacer 112, 114 may be made to facilitate the slideable movement of at least one spacer 112, 114 in operation. As a nonlimiting example, a suitable lubricant may be disposed between at least one of the guide rail 106 and the at least one spacer 112, 114 to facilitate the slidable movement of the at least one spacer 112, 114 in operation. Roller bearings (not shown) may also be employed, in certain embodiments.

In certain embodiments, the first axis is oriented orthogonal to the second axis, and the third axis is oriented orthogonal to both the first axis and the second axis. For example, as shown in FIGS. 1-8, the first axis may be a Y-axis along a height of the battery cell module 100, the second axis may be an X-axis along a width of the battery cell module 100, and the third axis may be a Z-axis along a length of the battery cell module 100.

Figures 3, 4:
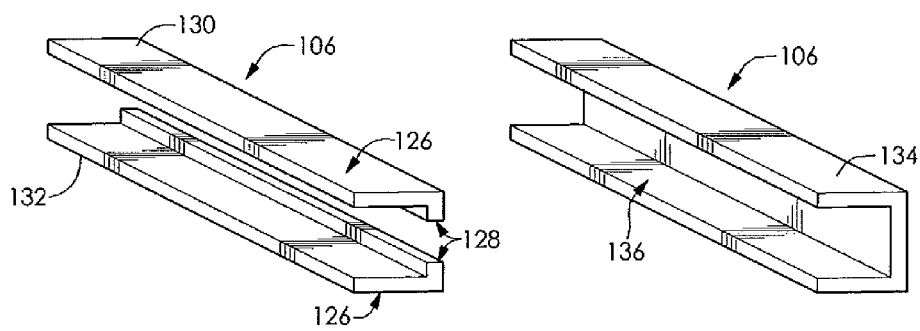
FIG. 3 is a front perspective view of a side rail for a battery cell module according to one embodiment of the present disclosure.
FIG. 4 is a front perspective view of a side rail for a battery cell module according to another embodiment of the present disclosure.
Figure 5:
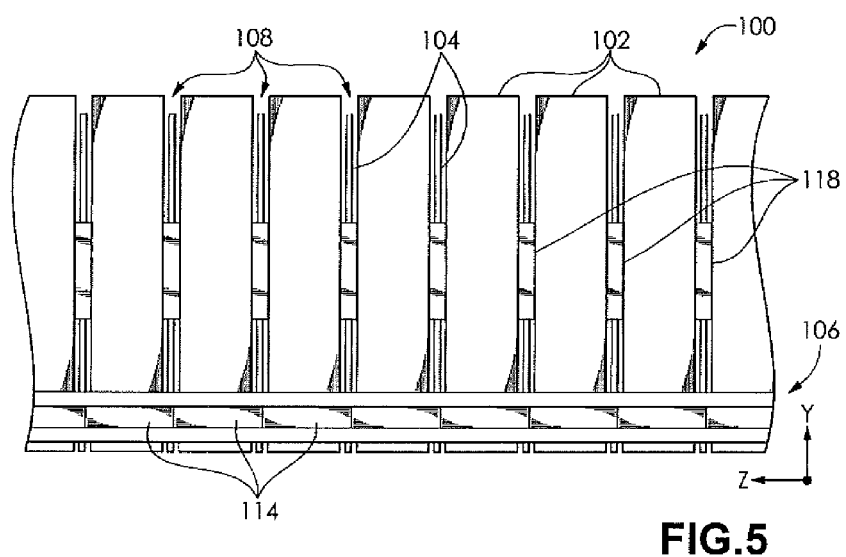
FIG. 5 is a fragmentary side elevational view of a battery cell module according to one embodiment of the present disclosure, including the repeating element depicted in FIGS. 1-2 and the side rail depicted in FIG. 3.
Figure 6:
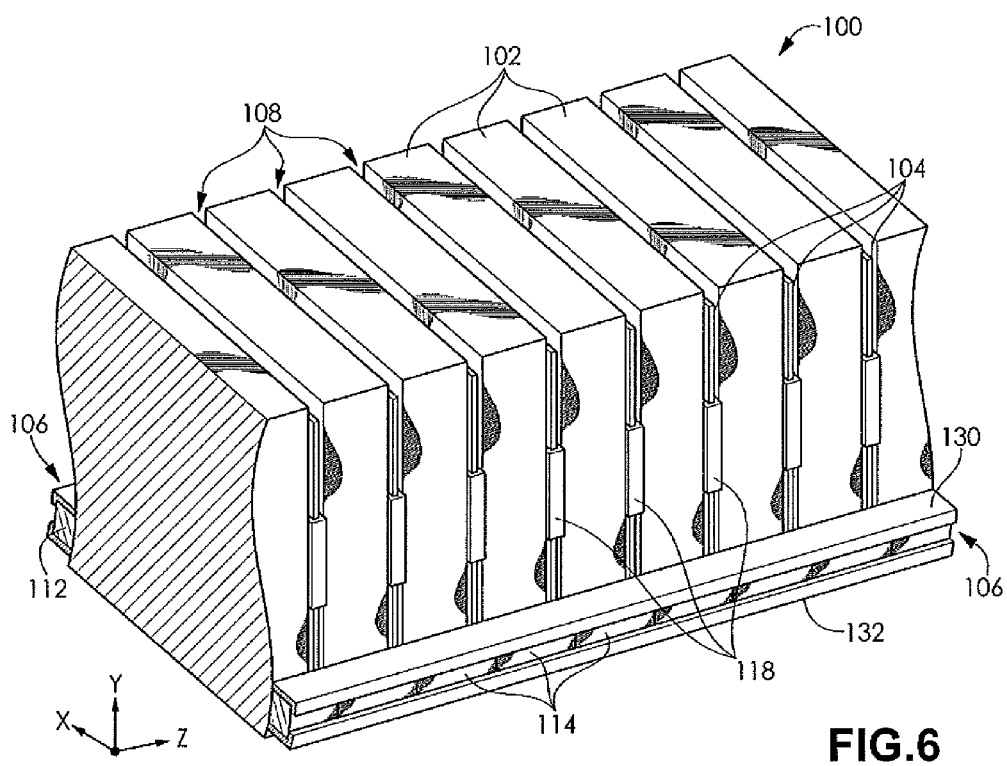
FIG. 6 is a fragmentary front perspective view of the battery cell module depicted in FIG. 5.

The guide rail 106 of the present disclosure may have any shape suitable for constraining the at least one spacer 112, 114 along the first axis and the second axis, while permitting the slidable movement of the at least one spacer 112, 114 along the third axis. In certain embodiments, for example, as depicted in FIGS. 3 and 5-6, the guide rail 106 includes a pair of spaced apart members 130, 132 having a first portion 126 that is oriented substantially orthogonal to a second portion 128. As a nonlimiting example, each of the spaced apart members 130, 132 may be substantially L-shaped in cross-section. The at least one spacer 112, 114 is slidably disposed between the pair of spaced apart members 130, 132 during assembly of the battery cell module 100.

Figure 7:
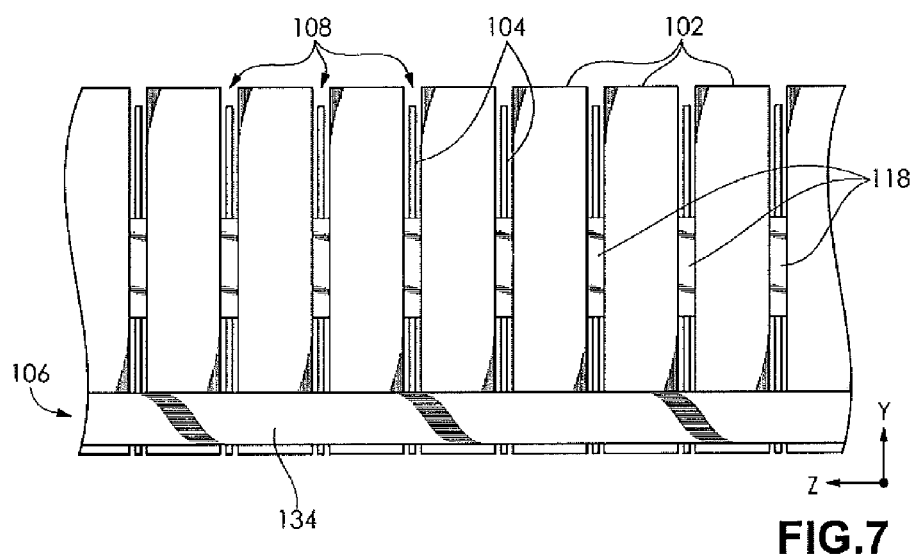
FIG. 7 is a fragmentary side elevational view of a battery cell module according to another embodiment of the present disclosure, including the repeating element depicted in FIGS. 1-2 and the side rail depicted in FIG. 4.
Figure 8:
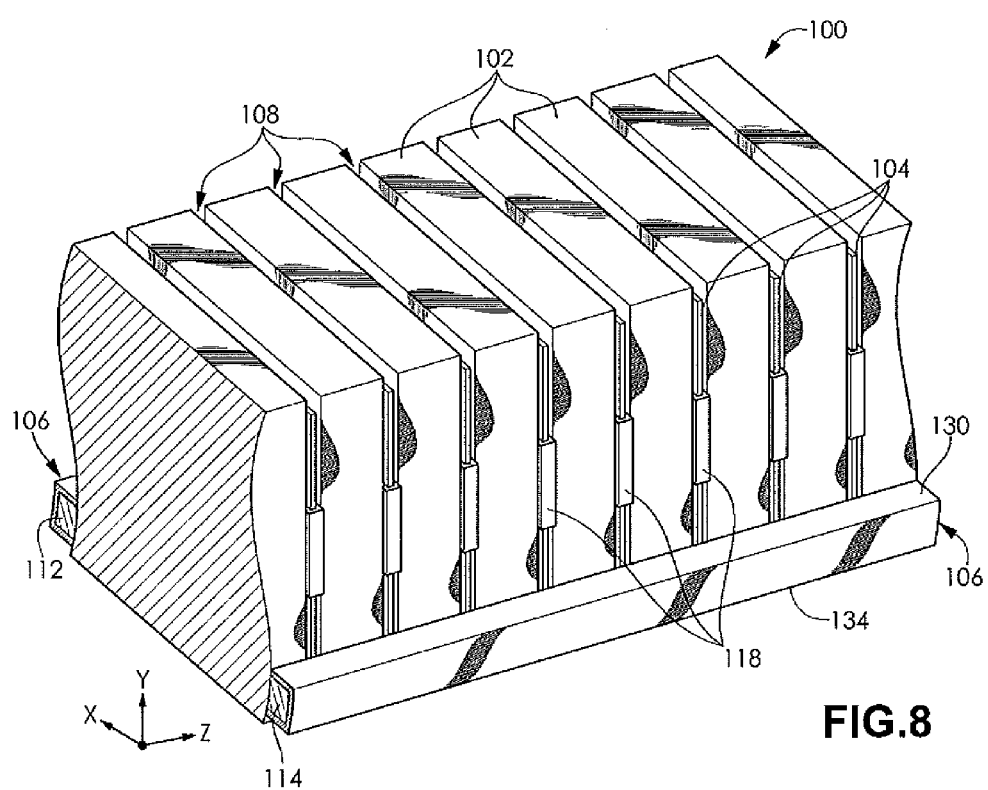
FIG. 8 is a fragmentary front perspective view of the battery cell module depicted in FIG. 7.

In other embodiments, for example, as depicted in FIGS. 4 and 7-8, the guide rail 106 includes a unitary member 134 having a channel 136 formed along a length of the unitary member 134. The at least one spacer 112, 114 is slidably disposed in the channel 136. As a nonlimiting example, the guide rail 106 may be substantially C-shaped in cross-section. Other shapes for the guide rail 106 may also be used within the scope of the present disclosure.

Advantageously, the battery cell module 100 of the present disclosure compensates for expansion of the battery cells 102 with changing temperature, and permits an air cooling system to be used by maintaining a desired width of the gaps 108 through which the cooling air flow is circulated. In particular, the battery cell module 100 permits the expansion along only one axis, and the at least one spacer 112, 114 has a predetermined length that allows the battery cells 102 to expand while providing overcompression protection.

Skilled artisans also appreciate that the at least one spacer 112, 114 of the repeating element 104 that cooperates with the at least one guide rail 106 permits a manufacturing variation in a thickness of the battery cells 102 at beginning of life, due to the ability of the at least one spacer 112, 114 to slide inside of the at least one guide rail 106.

While certain representative embodiments and details have been shown for purposes of illustrating the invention, it will be apparent to those skilled in the art that various changes may be made without departing from the scope of the disclosure, which is further described in the following appended claims.

What is claimed is:

1. A battery cell module, comprising:
a plurality of battery cells;
a plurality of repeating elements disposed adjacent the battery cells, each of the repeating elements having a main body with a first major side surface and a second major side surface disposed opposite the first major side surface, and a gap defined between the battery cell and the repeating element, each of the repeating elements having the main body with at least one spacer and at least one gap setting portion coupled thereto, wherein the at least one spacer has an elongate body with a first end and a second end, the first end disposed flush with the first major side surface, and the second end extending outwardly from the second major side surface; and
a guide rail cooperating with the at least one spacer and permitting the repeating elements to move with an expansion of the battery cells and militate against an overcompression of the battery cells, wherein the at least one spacer is disposed between the guide rail and the main body of the repeating element and also between adjacent ones of the main bodies of the repeating elements.

2. The battery cell module of claim 1, wherein the battery cell is a prismatic can-type battery.

3. The battery cell of claim 1, wherein the repeating element is a cooling plate.

4. The battery cell module of claim 1, wherein the at least one gap setting portion has a thickness greater than a thickness of a remaining portion of the main body.

5. The battery cell module of claim 4, wherein the at least one gap setting portion includes a first gap setting portion adjacent a first side of the main body and a second gap setting portion adjacent a second side of the main body.

6. The battery cell module of claim 5, wherein the at least one gap setting portion abuts the battery cell and the gap is defined by a space between the battery cell and the repeating element.

7. The battery cell module of claim 1, wherein the at least one spacer includes a first spacer and a second spacer, the first spacer disposed on a first side of the main body and the second spacer disposed on a second side of the main body.

8. The battery cell module of claim 7, wherein each of the first spacer and the second spacer is disposed adjacent a bottom side of the main body.

9. The battery cell module of claim 1, wherein the guide rail constrains the at least one spacer along a first axis and a second axis, and permits a movement of the at least one spacer along a third axis.

10. The battery cell module of claim 9, wherein the first axis is oriented orthogonal to the second axis, and the third axis is oriented orthogonal to both the first axis and the second axis.

11. The battery cell module of claim 10, wherein the first axis is a Y-axis along a height of the battery cell module, the second axis is an X-axis along a width of the battery cell module, and the third axis is a Z-axis along a length of the battery cell module.

12. The battery cell module of claim 1, wherein the guide rail includes a pair of spaced apart members that are each substantially L-shaped in cross-section.

13. The battery cell module of claim 12, wherein the spacer is slidably disposed between the pair of spaced apart members.

14. The battery cell module of claim 1, wherein the guide rail is a unitary member having a channel formed along a length thereof.

15. The battery cell module of claim 14 wherein the spacer is slidably disposed in the channel.

16. The battery cell module of claim 15, wherein the guide rail is substantially C-shaped in cross-section.

17. A battery cell module, comprising:
a plurality of battery cells;
a plurality of repeating elements, the repeating elements alternating with the battery cells in a stack and defining a plurality of gaps therebetween, each of the repeating elements having a main body with at least one spacer and at least one gap setting portion coupled thereto, and each of the repeating elements having the main body with a first major side surface and a second major side surface disposed opposite the first major side surface, wherein the at least one spacer has an elongate body with a first end and a second end, the first end disposed adjacent the first major side surface, and the second end extending outwardly from the second major side surface; and
at least one guide rail cooperating with the at least one spacer and permitting the repeating elements to move with an expansion of the battery cells and militate against an overcompression of the battery cells, wherein the at least one spacer is disposed between the guide rail and the main body of the repeating element and also between adjacent ones of the main bodies of the repeating elements.

18. A battery cell module, comprising:

a plurality of battery cells;

a plurality of repeating elements, the repeating elements alternating with the battery cells in a stack and defining a plurality of gaps therebetween, each of the repeating elements having a main body with at least one spacer coupled thereto, and including at least one gap setting portion having a thickness greater than a thickness of a remaining portion of the main body, each of the gap setting portions abutting one of the battery cells~and each of the repeating elements having a main body with a first major side surface and a second major side surface disposed opposite the first major side surface, wherein the at least one spacer has an elongate body with a first end and a second end, the first end disposed adjacent the first major side surface, and the second end extending outwardly from the second major side surface; and at least one guide rail cooperating with the at least one spacer and permitting the repeating elements to move with an expansion of the battery cells and militate against an overcompression of the battery cells, the at least one guide rail constraining the at least one spacer on a Y-axis along a height of the battery cell module, an X-axis along a width of the battery cell module, and permitting a movement of the at least one spacer on a Z-axis along a length of the battery cell module, wherein the at least one spacer is disposed between the guide rail and the main body of the repeating element and also between adjacent ones of the main bodies of the repeating elements.

\* \* \* \* \*